United States Patent [19]
Kaiser et al.

[11] Patent Number: 5,713,029
[45] Date of Patent: Jan. 27, 1998

[54] INFORMATION HANDLING SYSTEM INCLUDING DOZE MODE CONTROL

[75] Inventors: John Michael Kaiser; Warren Edward Maule, both of Cedar Park, Tex.

[73] Assignee: International Business Machines Corporation, Armonk, N.Y.

[21] Appl. No.: 537,180

[22] Filed: Sep. 29, 1995

[51] Int. Cl.[6] .................. G06F 1/32; G06F 13/36
[52] U.S. Cl. ..................... 395/750; 395/293; 364/707
[58] Field of Search ........................ 395/750, 856, 395/293, 560, 287; 364/707

[56] References Cited

U.S. PATENT DOCUMENTS

| | | | |
|---|---|---|---|
| 5,361,392 | 11/1994 | Fourcroy et al. | 395/800 |
| 5,375,222 | 12/1994 | Robinson et al. | 395/425 |
| 5,416,910 | 5/1995 | Moyer et al. | 395/293 |
| 5,463,753 | 10/1995 | Fry et al. | 395/473 |
| 5,471,625 | 11/1995 | Mussemann et al. | 395/750 |
| 5,530,932 | 6/1996 | Carmean et al. | 395/750 |
| 5,625,807 | 4/1997 | Lee et al. | 395/650 |

*Primary Examiner*—Gopal C. Ray
*Attorney, Agent, or Firm*—George E. Clark, Esq.; Jenkens & Gilchrist; Anthony V.S. England, Esq.

[57] ABSTRACT

An information handling system includes a system memory controller having a control register in which a bit is reserved for Doze mode control. The Doze control bit is set by system software whenever it places any processor into Doze mode. Until this bit is set, there is no wake up signal issued nor any performance lost. Whenever this control bit is set, the memory controller sends a signal to the system arbiter that informs it to issue a "wake up signal" before issuing an address bus grant, in time to satisfy the processor wake up latency. In addition, if the system arbiter receives another address bus request within a predefined time window, the "wake up signal" is held active without adding to the bus grant latency. If maximum system performance is desired (all processors out of Doze mode), the system software resets the Doze mode control bit in the memory controller, which removes the signal to the system arbiter which controls the wake up signal and removes the added latency for granting the bus.

7 Claims, 2 Drawing Sheets

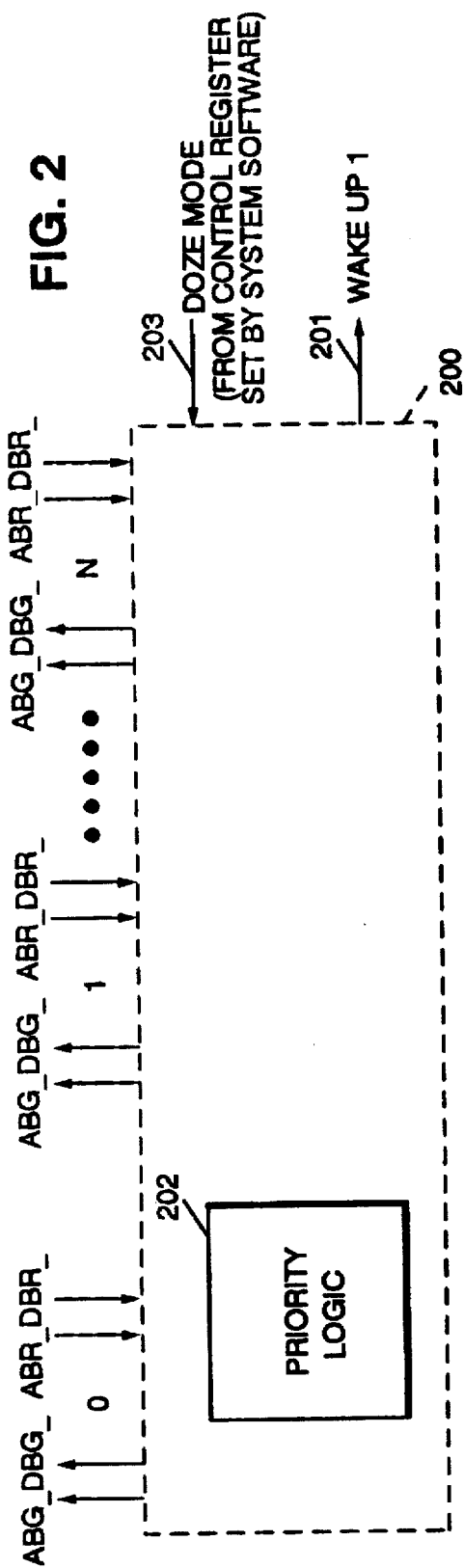
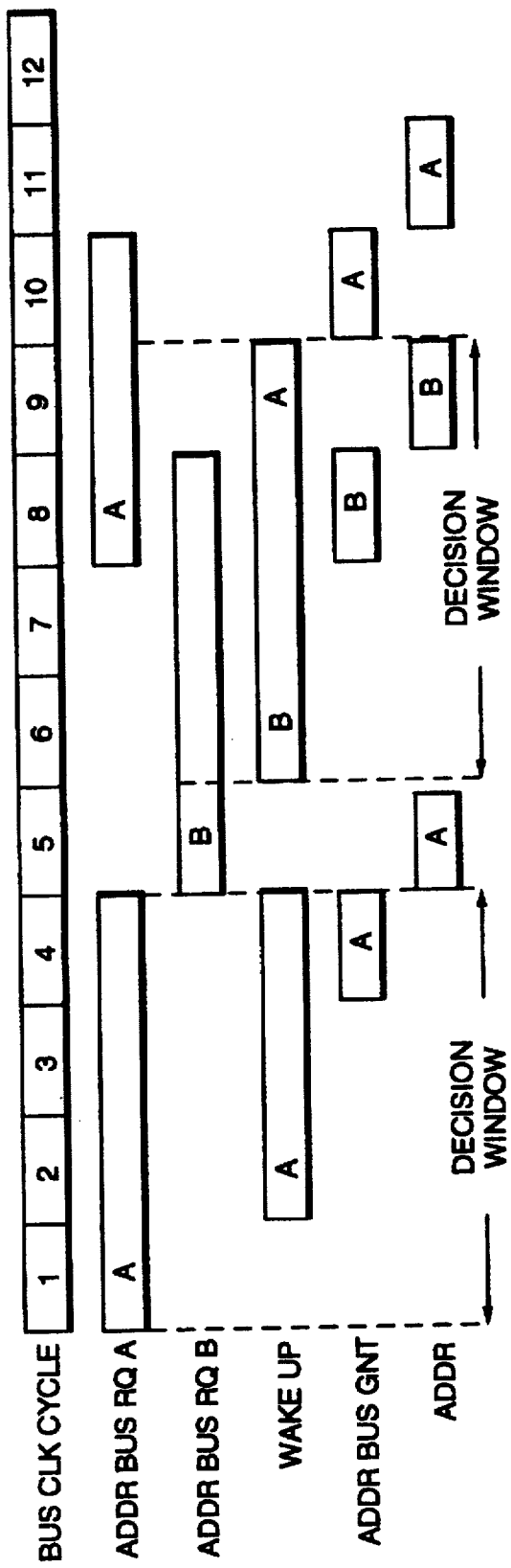

INFORMATION HANDLING SYSTEM INCLUDING DOZE MODE CONTROL

TECHNICAL FIELD OF THE INVENTION

The present invention relates to information handling systems, and more particularly to information handling systems including a power reduction (Doze) mode for high end processors to maximize power savings while minimizing the system performance impact.

BACKGROUND OF THE INVENTION

High end microprocessors are now being designed with a Power Savings mode called Doze mode which allows the processor to shut off all internal clocks, except those needed for time keeping, snooping, etc. Such a processor will watch for a "wake up signal" in order to snoop its internal caches for any modified data they may contain, and write back that data to memory before going back to Doze mode. The problem is that "wake up signal" needs to arrive at the processor several clock cycles before any address that needs to be snooped (the number may vary depending on processor design). The "wake up" signal may just be held active; however, that just forces the processors to always run its clocks to its caches and reduces the power savings.

SUMMARY OF THE INVENTION

It is an object of the present invention to efficiently control doze mode operation (i.e., power reduction mode operation in an information handling system which controls the timing of a wake-up signal and address bus grants to maximize power savings and minimize performance degradation in doze mode.

An information handling system includes a system memory controller having a control register in which a bit is reserved for Doze mode control. The Doze control bit is set by system software whenever it places any processor into Doze mode. Until this bit is set, there is no wake up signal issued nor any performance lost. Whenever this control bit is set, the memory controller sends a signal to the system arbiter that informs it to issue a "wake up signal" before issuing an address bus grant, in time to satisfy the processor wake up latency. In addition, if the system arbiter receives another address bus request within a predefined time window, the "wake up signal" is held active without adding to the bus grant latency. If maximum system performance is desired (all processors out of Doze mode), the system software resets the Doze mode control bit in the memory controller, which removes the signal to the system arbiter which controls the wake up signal and removes the added latency for granting the bus.

It is an advantage of the present invention that a controlled adaptive wake-up mechanism for use in an information handling system having processors with a doze mode for power saving operate in such a manner as to maximize power savings while minimizing system performance penalties.

Other features and advantages of the present invention will become apparent in the following detailed description of the preferred embodiment of the invention taken in conjunction with the accompanying drawing.

BRIEF DESCRIPTION OF THE DRAWING

FIG. 2 is a block diagram of an arbiter showing doze mode control in accordance with the present invention.

FIG. 3 is a timing diagram showing the timing of wake-up signal activity and address bus grants in accordance with the present invention.

DETAILED DESCRIPTION OF A PREFERRED EMBODIMENT OF THE INVENTION

Figure 1:
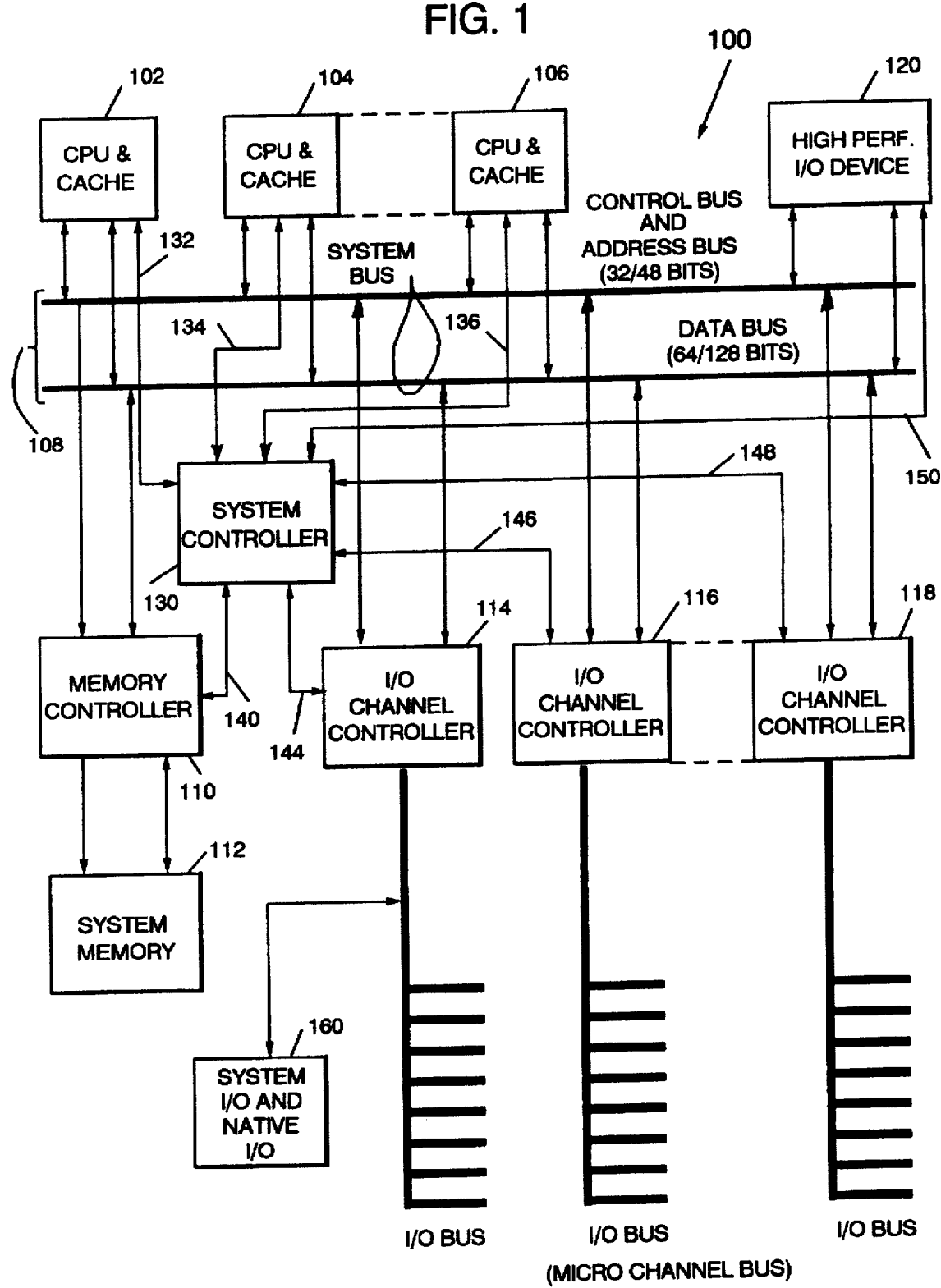
FIG. 1 is a block diagram of an information handling system in accordance with the present invention.

Referring now to FIG. 1, an information handling system 100 embodying the present invention will be described. Multiprocessor system 100 includes a number of processing units 102, 104, 106 operatively connected to a system bus 108. Also connected to the system bus 108 is a memory controller 110, which controls access to system memory 112, and I/O channel controllers 114, 116, and 118. Additionally, a high performance I/O device 120 may be connected to the system bus 108. Each of the system elements described 102-120, inclusive, operate under the control of system controller 130 which communicates with each unit connected to the system bus 108 by point to point lines such as 132 to processor 102,134 to processor 104, 136 to processor 106, 140 to controller 110, 144 to I/O channel controller 114, 146 to I/O channel controller 116, 148 to I/O channel controller 118, and 150 to high performance I/O device 120. Requests and grants of bus access are all controlled by system controller 130.

I/O channel controller 114 controls and is connected to system I/O subsystem and native I/O subsystem 160.

Each processor unit 102, 104, 106 may include a processor and a cache storage device.

One of the bus devices, such as processor 102, may request to enable an operation onto bus 108 from system controller 130 via connection 132. Upon receiving a bus grant from system controller 130, processor 102 will then enable an address onto bus 108.

Referring now to FIG. 2, the arbiter 200 as it applies to the present invention will be further described. Arbiter 200 is a part of system controller 130 (see FIG. 1). Arbiter 200 includes priority logic 202 which controls address bus grants (ABG) in response to address bus requests (ABR).

A control register in memory controller 110 has a bit position reserved for controlling Doze mode (i.e., for controlling the power reduction mode). Whenever the system software places any processor 102, 104, 106, etc., into Doze mode, the Doze mode bit (i.e., power reduction mode control bit) in the control register in memory controller 110 is set. That is, the system software provides a means for setting the power reduction control bit (i.e., Doze mode bit) when any processor is set to the power reduction mode. When a Doze mode bit is set in memory controller 110, a Doze mode signal is sent from memory controller 110 to system controller 130 on line 203 indicating Doze mode active (i.e., power reduction mode active).

The Doze mode active signal on line 203 also causes arbiter 200 to issue a wake-up signal on line 201 and hold the address bus grant for a predetermined number of clock cycles, for example, two clock cycles, to satisfy processor wake-up latency requirement.

If Arbiter 200 receives another address bus request within a predefined time window (address request B in FIG. 3), the wake-up signal is held active on line 201.

If maximum system performance is desired (all processors in operational rather than Doze mode), the system software resets the Doze mode control bit in the memory controller 110 which deactivates the Doze mode signal on line 203 to arbiter 200 and allows address bus grants with minimum latency delay.

Referring now to FIG. 3, the timing of the wake up signal 201 and address bus grant signals in accordance with the present invention will be further described.

FIG. 3 shows the timing of bus arbiter 200 including the controlled, adaptive wake up mechanism according to the present invention. The first bus request A causes arbiter 200 to issue a wake up signal on line 201 and then an address bus grant 2 clock cycles later so the wake up signal is seen by a dozing processor 102, for example, 2 two cycles before the address to be snooped. Since there are no more requests by the time the bus is granted, arbiter 200 drops the wake up signal 201 (i.e., arbiter 200 no longer issues the wake up signal as shown in clock cycle 5 of FIG. 3). In clock cycle 5, a new request B is received, and again, the wake up signal 201 is raised before the bus can be granted. This time, however, another request A is received in the decision window time, so arbiter 200 keeps the wake up signal 201 active and grants the bus to A without any additional latency due to the wake up requirement.

Accordingly, the scope of this invention is limited only by the following claims and their equivalents.

What is claimed is:

1. An information handling system, comprising:
   one or more processors having a power reduction mode;
   a memory controller, wherein the memory controller includes a control register having a power reduction mode control bit, the memory controller further for issuing a power reduction mode signal when the control bit is set;
   a memory system connected to the memory controller;
   one or more I/O controllers for controlling communication between one or more I/O devices, the memory system, and the processors;
   a system bus, connecting the processors, the memory controller, and the I/O controllers; and
   a system controller, controlling operation of each of the processors, the memory controller, and the I/O controllers, the system controller further including an arbiter for controlling address bus grants in response to address bus requests, the arbiter being operable, in response to the power reduction mode signal from the memory controller and a first address bus request, for (i) issuing a wake-up signal to the processors prior to issuing an address bus grant and (ii) no longer issuing the wake-up signal to the processors when there are no additional address bus requests by the time the bus is granted in response to the first address bus request.

2. An information handling system, according to claim 1, further comprising: means for setting the power reduction mode control bit when any processor is set to the power reduction mode, wherein the setting means includes system software.

3. An information handling system, according to claim 2, wherein
   the arbiter further issuing the address bus grant after a predetermined number of clock cycles following the issuing of the wake up signal.

4. An information handling system, according to claim 1, wherein
   the arbiter is further operable for (iii) continuing to issue the wake up signal to the processors when there is an occurrence of an additional address bus request by the time the bus is granted in response to the first address bus request.

5. A method, for controlling a power reduction mode operation in an information handling system having one or more processors, a memory controller, a memory system connected to the memory controller, one or more I/O controllers for controlling communication between one or more I/O devices, the memory system, and the processors, a system bus, connecting the processors, the memory controller, and the I/O controllers and a system controller, controlling operation of each of the processors, the memory controller, and the I/O controllers, wherein the memory controller includes a control register having a bit reserved for power reduction mode control, comprising the steps of:
   setting the power reduction control bit when any processor is set to a power reduction mode and issuing a power reduction mode signal from the memory controller;
   issuing, from the system controller, in response to the power reduction mode signal and a first address bus request, a wake up signal to the one or more processors prior to issuing an address bus grant; and
   no longer issuing the wake-up signal to the one or more processors when there are no additional address bus requests by the time an address bus is granted in response to the first address bus request.

6. A method, according to claim 5, further comprising the step of:
   granting access to the address bus after a predetermined number of clock cycles following the issuance of the wake up signal.

7. A method, according to claim 5, further comprising the step of:
   continuing to issue the wake up signal to the processors when there is an occurrence of an additional address bus request by the time the bus is granted in response to the first address bus request.

\* \* \* \* \*